A. Stratton
*Inventor*

Patented July 4, 1950

2,513,530

UNITED STATES PATENT OFFICE 2,513,530

IMPEDANCE MEASURING DEVICE UTILIZING OSCILLATORY ELECTRIC CIRCUITS

Andrew Stratton, Welling, England

Application August 5, 1947, Serial No. 766,252
In Great Britain December 4, 1945

Section 1, Public Law 690, August 8, 1946
Patent expires December 4, 1965

9 Claims. (Cl. 175—183)

This invention relates to oscillatory electric circuits or systems and to apparatus embodying oscillatory electric circuits or systems.

The invention is based on the observation that if a self-excited thermionic valve oscillator is loaded by an impedance suitably coupled into the circuit, the operating conditions of the valve will change, changing the mean anode and/or grid current and that the change in current may be employed as a measure of the impedance coupled into the circuit which will thus form an impedance sensitive detector.

Instead of utilising, as is usual, the change in anode current, the oscillator circuit according to this invention is characterised by the utilisation of the change in grid current or voltage resulting from a change in the impedance load, however caused. Thus there is provided according to this invention an electric detector or measuring system wherein a variable function is applied as a variable impedance in the operating circuit of a self-excited thermionic valve oscillator and is derived from the control grid circuit of the oscillator as a signal output which is indicative of the variation of the function.

The signal output is a continuous function of resistance over a wide range of loading resistance and the sensitivity and working range of load resistance are substantially independent of circuit constants, valve characteristics and cathode temperature and, further, good sensitivity is obtained at high power levels.

The circuit constitutes a detector system which can be made sensitive to either change in resistive component or change in reactive component of a complex load impedance.

The circuit may be applied for instance (1) as a detector system for radio altimeter work, (2) as a detector system for strain gauge measurements in particular for capacitance strain gauges and (3) as a means of detecting or measuring any impedance change however caused, and (4) as a combined transmitter and receiver for various purposes including detecting the presence or relative approach of an object.

For example in the last mentioned application of the invention there may be coupled to the tank circuit a transmitting aerial in which the resistance and reactance of the aerial changes due to the reception of reflected waves and the resulting change in grid current or voltage is applied as a signal or output.

In order that the invention may be readily understood and carried into effect, in its various applications, reference will be made to the accompanying drawings in which.

For achieving the requirements of the oscillator according to this invention, it has been found that the valve or valves should work under class C conditions. Investigation under such conditions shows that a quantity N defined as $$N = \frac{Ig}{Ia + Ig} \qquad (1)$$

(where $Ig$ is the mean grid current and $Ia$ is the mean anode current) varies according to a predictable law which is independent of supply voltage variations and depends only on the internal impedance of the oscillator and thus N plotted against the load impedance gives a curve which follows the law $$\frac{N_0}{N} = 1 + \frac{r}{R} \qquad (2)$$

where $N_0$ is the value of N when the load impedance R is infinite, $r$ is the internal impedance of the oscillator considered as a radio frequency generator with output terminals at anode and grid in the case of a single ended oscillator, or with output terminals at the two anodes in the case of a push pull oscillator, and R is the value of load impedance connected across the output terminals.

Thus where the oscillator is adapted for measuring an unknown impedance, if $r$ is determined once by direct calibration, R (the unknown) can be ascertained by a direct reading of the ratio $N_0/N$. Because of the independence of this curve of power supply variations, and the small variation of $r$ with valve parameters, great stability of calibration may be achieved.

For any value of internal impedance (i. e. for any given oscillator, the invention being applicable to various self-excited class C working oscillators) measurement of impedance "R" can be made with accuracy over three decades of resistance, and unbalanced or balanced impedances to ground can be measured by a single ended (e. g. Colpitts) or push pull oscillator. In particular, reasonably accurate measurements of impedance can be made at all frequencies at which a triode or any multi-grid or multi-electrode valve working as a grid leak stabilised class C oscillator will operate. In the examples to be given the internal impedance of the oscillator is measured, and the unknown impedance connected, to two terminals in parallel with the tank circuit; such a connection is best suited for measurements in the range 1000 ohms to 1 megohm. Alternatively, any two other terminals can be chosen, for example, the tank circuit can be broken and the unknown impedance connected in series with the tank circuit, the internal impedance also being measured at the same two terminals, such a connection being suited for measurements in the range 0.1 ohm to 100 ohms.

Figure 1:
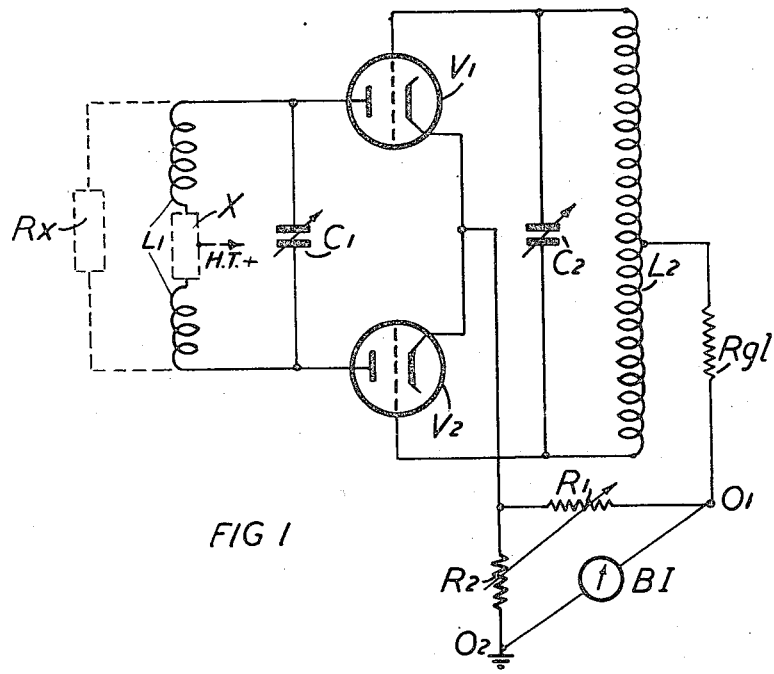
Figure 1 shows an example of a typical oscillator circuit according to the invention arranged for measurement of an unknown impedance RX.

In Figure 1 the oscillator in the measuring circuit is a push-pull type comprising valves V1 and V2 having their anodes coupled by the tuned circuit L1.C1 and the grids connected by the tuned circuit L2.C2, with the cathodes connected to ground over variable resistance R2, and the midpoint of L2 also going to ground over grid leak resistance Rg1 and variable resistances R1 and R2. A balance indicator BI is connected across R1 and R2.

At balance $R1.Ig = R2.Ia = (3)$ — thus as $$N = \frac{Ig}{Ia + Ig}$$

from (1) above, therefore from (3)

$$N = \frac{R2}{R1 + R2} \qquad (4)$$

The load impedance RX to be measured is connected across L1 or in series at X as appropriate. To calibrate the equipment, known resistances (whose R. F. and D. C. properties are identical) e. g. they may be made of thin metallic film, are introduced at RX or X and the internal impedance of the oscillator is found by inserting the values of N from (4) in (2), thereafter the unknown load impedance RX can be ascertained by the use of Formulas (4) and (3), the values of resistances R1 and R2 being read off when balance is obtained on the indicator BI by adjustment of these resistances R1 and R2.

The frequency at which the oscillator is excited can be varied by adjustment of condenser C1 and then tuning C2 to give maximum value of N. The reactive component of the unknown impedance is obtained by calibrating C1 and noting the change necessary to bring the frequency back to its previous value before the unknown impedance was inserted.

Figure 2:
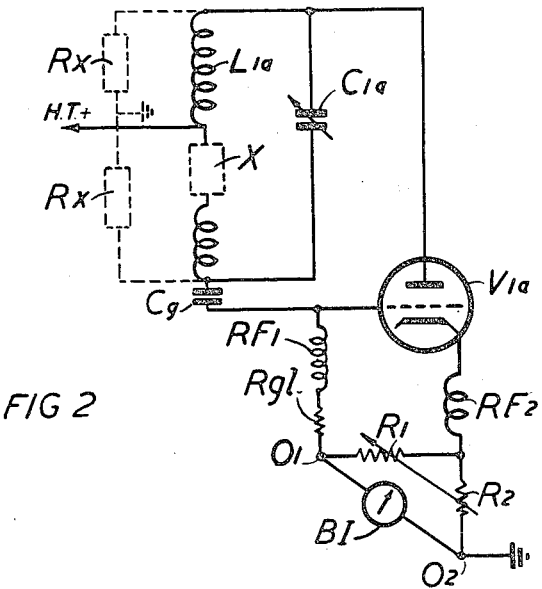
Figure 2 shows an alternative circuit for measurement of an unknown impedance.

Figure 2 shows a single-ended oscillator circuit according to the invention suitable for measurements of impedances which are unbalanced with respect to ground, as distinct from the circuit shown in Figure 1 which is applicable to measurements of impedance which is balanced relative to ground.

In the circuit shown there is the single valve V1A having a tank circuit L1A, C1A between anode and grid with an interposed grid condenser Cg, and the grid circuit including the variable resistances R1 and R2, and the grid leak resistance Rg1, together with grid and cathode radio frequency chokes RF1 and RF2 respectively, the balance indicator BI being connected across resistances R1 and R2 at points O1 and O2 as in Figure 1. The variable load impedance RX to be measured may be connected to ground across the whole or either half of the centre fed inductance L1a or in series between the halves of the inductance at X according as to which coupling is most suitable and, thereafter, calibration and measurement may be substantially as described with reference to Figure 1.

In the above described application of the invention the variation of impedance load which is to be detected is not continuously variable but selectively according to the impedance introduced at $Rx$ or $X$ but the output signal indicated on BI and derived from the grid circuit at the points O1 and O2 across the variable resistance R1 and R2 is, nevertheless, a measure of the impedance variation deliberately applied and may be utilised as above described to ascertain the value of the unknown impedance; instead of a balance indicator the signal across O1—O2 could be arranged to operate a direct reading indicator appropriately calibrated; the calibration will not, however, be independent of supply voltages.

For detection of impedance change of a more or less continuously varying nature as would occur in strain and other gauge measurements; and particularly in a radio proximity fuze which is intended to detect the presence or relative approach of an object, the internal impedance of the oscillator is selected to match the mean load impedance (e. g. the aerial in the case of the fuze) and this is achieved partly by transforming the load impedance and partly by selection of the valve characteristics and the grid leak to give the appropriate internal impedance. In this manner the change in the grid current will be a measure of any change in load impedance and can be utilised for operation of an indicator or to set off appropriate mechanism, as for example the detonating system in the case of the fuze.

The way in which the grid current varies with loading in this case will, from Equations 1 and 2 be seen to depend on the way in which the anode current varies with loading. It will be preferable, although not necessary, to design the oscillator such that the anode current is substantially constant over the working range. The shape of the sensitivity curve in this instance, is such that the sensitivity $$S = R \cdot \frac{dVg}{dR}$$

(where $Vg = Ig \times Rg$) may be substantially constant over a wide range of the order of a decade of resistance, the sensitivity being a maximum at a load resistance which is equal to the internal impedance of the oscillator. The variation in $Vg$ alone can be taken as a measure of impedance change, and thus an output can be taken from the grid circuit, which is a function of the load on the oscillator. Using this direct indication the range of substantially constant sensitivity is sufficiently large that variations between individual oscillators and aerials (or other impedances) due to normal production variations will not materially affect the required performance.

Figure 3:
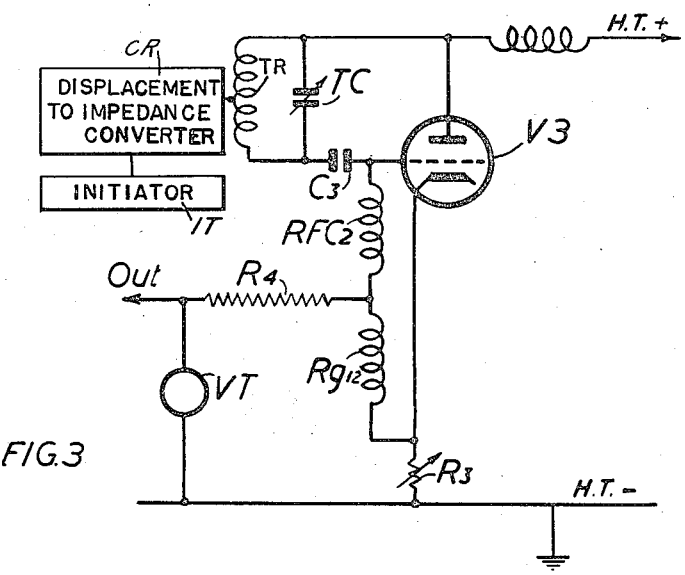
Figure 3 shows an example of the invention applied as an indicator for a strain gauge or servo pick-up.

Referring to Figure 3 it will be seen that for strain gauge measurements or for servo pick-up operation the invention may provide a simple series-fed-divided Hartley type oscillator comprising valve V3 with tuned tank circuit comprising inductance TR and variable condenser TC, grid condenser C3, the grid circuit including radio frequency choke RFC2 and grid leak Rgl2 to the earthy point of which the cathode is connected and led to ground over variable resistance R3. The output "Out" is taken from the junction of RFC2 and grid leak Rgl2, over resistance R4, a voltmeter VT being connected across the three resistances R3, Rgl2 and R4 in series.

The signal to be measured is applied by inductive or other coupling to coil TR and is received from the initiator, e. g. the servomotor or strain gauge depicted generally by the rectangle IT which feeds its displacement to a convertor CR adapted to change displacement into impedance variations which are then passed to the oscillator circuit. In operation of the circuit, R3 is adjusted so that VT indicates zero at the mean or zero position of the initiator IT; then the D. C. output over the "Out" lead will be of positive or negative polarity in respect of ground in accordance with variations of displacement above or below the mean position of the initiator; and may be utilized to operate a follow-up device (after suitable amplification) in the case of the servo pick-up application, or a cathode ray tube indicator in the case of strain gauge measuring. It will be noted from Equations 1 and 2 that although the slope of the initiator displacement to voltage curve will depend on the supply voltage, the zero setting of such curve will be independent of supply voltage fluctuations. The output is taken through the isolating resistance R4 to prevent the circuits following from affecting the oscillator.

Figure 4:
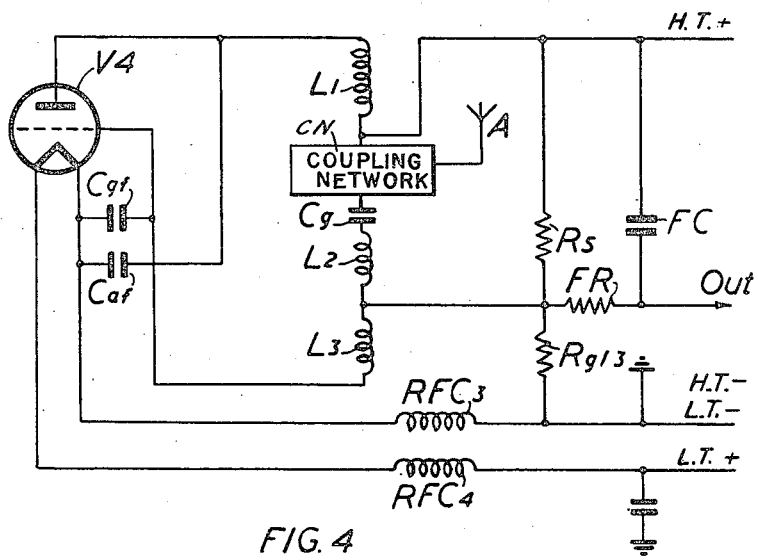
Figure 4 shows an oscillator according to the invention, adapted as a combined transmitter and receiver for a radio proximity fuze.

Figure 4 shows the application of the invention to a radio proximity fuze which is required to operate when it approaches a particular objective by the change in aerial impedance. For this purpose the fuze is provided with an aerial, which may form part of the exterior of the fuze, and the aerial impedance change resulting from the received reflected signal is to be effective to vary, in accordance with this invention, the grid output from the combined transmitter and receiver, which grid output leads to and controls the detonating section of the fuze.

The impedance change for any aerial on approaching a reflecting body is composed of a resistance and reactance change. This variation will thus produce amplitude and phase modulation of the received signal in the aerial and it is required that the receiving system shall be able to de-modulate this signal. In the arrangement to be described the impedance sensitive detector works on the amplitude modulation of the signal.

Normally the aerial impedance is fixed by mechanical considerations connected with the fuze and will be of different magnitude from the optimum load of the oscillator (which from Equation 2 is equal to the internal impedance); where such difference arises a suitable coupling network may be provided to transform the aerial impedance into a load suitable for the oscillator, in a manner which will be well understood in the art.

While in this application of the invention any conventional thermionic valve oscillator circuit may be constituted as the combined transmitter and receiver and may be so adapted as to detect and enable the variation in impedance load in the tank circuit to be extracted from the grid circuit in the form of a signal which is an accurate measure of the variation referred to, investigations and experience have shown that the embodiment of the invention shown in Figure 4 has certain advantages.

Figure 4 shows a typical optimum circuit comprising thermionic valve V4 with filament radio frequency chokes RFC3 and RFC4 and padding condensers Caf and Cgf across the anode-cathode and grid cathode valve capacities respectively. The tank circuit comprises the divided inductance L1, L2, L3 and the grid blocking condenser Cg, the feed to this circuit from the aerial A being taken through a coupling network CN to the junction between coil L1 and condenser Cg while the output is taken from the grid circuit at the junction between coils L2 and L3, over the filter resistance FR and a small condenser FC. Rgl3 is the grid leak resistance and R5 a positive bias resistance connected between the filter FR—FC and the junction of the two coils L2 and L3.

The circuit above detailed is based on the following considerations. Sensitivity $$(S=RdVg/dR)$$

is approximately proportional to the grid voltage obtainable with any load on the oscillator so that in order to obtain an adequate sensitivity an efficient oscillator with high grid drive is necessary: accordingly the oscillator losses are kept as low as possible and the "divided" type of circuit as shown is used.

In order to prevent superregeneration or "squegging" and generally to obtain a high power, the normal grid blocking condenser of the Colpitts circuit is transferred, as shown, to a position between coils L1 and L2 to comprise thereby an approximately series-tuned circuit L2.Cg. The condenser Cg is sufficiently small to prevent superregeneration whatever the load on the oscillator, and by choosing L2 to resonate approximately at the frequency of oscillation of the Colpitts oscillator) with condenser Cg, the combination proves an effective low impedance by-pass to the grid leak resistance Rgl3.

To induce stable oscillations at heavy loading it is advantageous to bias the grid positively; this also assists in maintaining Ia constant. The positive bias is derived by returning the grid to positive H. T. through the resistance R5 (which may be of the order of 250,000 ohms) as well as to earth through the grid leak Rgl3.

As will be seen the output "out" is obtained direct from the grid leak through the filter, which may have a value of the order of 100,000 ohms for resistance FR and 100 micro-microfarads for the condenser FC; it will be noted that owing to the low impedance of the series tuned circuit L2—Cg no extra loss is introduced by deriving the output in this manner. The filter is necessary so as to isolate the grid of the oscillator from the circuit to which the output is connected to prevent superregeneration.

Certain factors have to be considered in choosing the anode-cathode and grid-cathode capacities Caf and Cgf respectively; these factors are:

(a) The greater the ratio Caf; the greater will be the oscillating grid voltage. Hence the greater the sensitivity.

(b) The greater the ratio Caf:Cgf the greater will be the drain on the H. T. supply and the greater the peak current demanded from the cathode. If the valve will not supply the increased peak current no increase in sensitivity will be obtained, and the performance, when any variations in supply voltage occur, will become poor. A satisfactory compromise can be effected by choosing $Caf$ and $Cgf$ so that the anode current remains substantially constant as the load on the oscillator is increased.

Any oscillator valve can be used that will give the necessary peak emission, and oscillate with stability at all loadings. Provided that the above conditions are fulfilled, the performance of the circuit is not critically dependent on valve characteristics.

By way of example the following circuit values are quoted as having been found most suitable for two operating frequencies 30 and 60 megacycles respectively. The circuit arrangement, shown in Figure 4, is independent of the valve used apart from the choice of grid leak and bias and any adjustment of condensers $Cag$, $Cgf$ necessitated by difference between capacity of various valves.

60 mc./s oscillator optimum series load in tank circuit, 5.5 ohms:
$L_1 = 3\frac{1}{4}$ turns
$L_2 = 8$ turns } 18 S.W.G. on former 0.55"
$L_3 = 4\frac{1}{2}$ turns   dia. threaded 11 T.P.I.
$Cg = 10$ micro-microfarads
$Caf = Cgf = 10$ micro-microfarads to 15 micro-microfarads 30 mc./s. oscillator optimum series load 5.5 ohms:
$L_1 = 3\frac{1}{4}$ turns
$L_2 = 7$ turns } 18 S.W.G. on 1" diameter
$L_3 = 4\frac{1}{2}$ turns   former threaded 11 T.P.I.
$Cg = 15$–$17$ micro-microfarads
$Caf = Cgf = 30$ micro-microfarads 30 mc./s. oscillator optimum series load 3.3 ohms:
$L_1 = 3\frac{3}{4}$ turns
$L_2 = 9$ turns } 18 S.W.G. on former 0.55"
$L_3 = 6\frac{1}{2}$ turns   dia. threaded 11 T.P.I.
$Cg = 30$ micro-microfarads
$Caf = Cgf = 40$ micro-microfarads The following notes may be of assistance in designing a circuit for use under other conditions of load or frequency.

Due to the high impedance grid condenser, the padding condensers will not have the normal effect on frequency, only varying it within small limits.

The grid condenser will have a large effect on frequency, and should be fixed first at some arbitrary value. If the value chosen is unsuitable it can be changed together with $L_2$, as a final adjustment.

The tapping point on $L_1 + L_2$ to make $L_2$ approximately in resonance with $Cg$ can easily be obtained by adjusting for maximum grid current.

The ratio $L_1 : L_3$ is chosen by adjusting for minimum loss, i. e. maximum grid voltage.

The unloaded grid voltage should be of the order 50% of the H. T. voltage if the oscillator is functioning correctly.

As the oscillator behaves as a generator with fixed internal impedance at the anode and grid output terminals, the L/C ratio of the tank circuit will have no effect (apart from increased losses) on the optimum load for the oscillator if parallel loading is used. If series loading is used then as the load appearing across the tank circuit is L/C × series load, then some control of the optimum series load can be exercised by the choice of L/C.

I claim:

1. A device responsive to the resistance of an element comprising an oscillator including an electron discharge device having a cathode, a control grid, and an anode; said oscillator including biasing means for applying sufficient bias to said grid to thereby effect class C operation of the device; said oscillator also including a main tank circuit connected to the cathode-anode path of said device to control oscillation of the oscillator; means connecting the element whose resistance is to be measured to said tank circuit to thereby modify the characteristics of the latter; and means which changes according to the resistance of said element comprising a current-sensitive element connected to and responsive to the current flowing to said grid.

2. In a device for giving a response in accordance with the resistance of an element; an oscillator including an electron discharge device having a cathode, a control grid, and an anode; said oscillator including grid bias means to effect class C operation of said device and also including a main tank circuit connected to the cathode-anode path; means associated with said tank circuit adapted to permit the element whose resistance is to be measured to be connected to the tank circuit; and means connected to the grid circuit and responsive to the current flow therein for giving a response depending on the change in resistance of the tank circuit upon the association of said element with said tank circuit.

3. A circuit for measuring resistance comprising a thermionic valve class C oscillator, said valve having at least a cathode, a grid adjacent to said cathode, and an anode, said oscillator having a tank circuit connected to the cathode-anode path of said valve, means for connecting the unknown resistance in the tank circuit of said valve, a resistance in the cathode circuit of said valve, a resistance in the grid circuit of said valve, and means for comparing the current flow in said two resistances.

4. A circuit for measuring an unknown resistance comprising the combination of a thermionic valve class C oscillator, said valve having at least a cathode, a grid adjacent to said cathode, and an anode, said oscillator including a tank circuit connected to the cathode-anode path of said valve, means for connecting the unknown resistance in the tank circuit of said valve oscillator, a resistor in the cathode circuit of said valve, a resistor in the grid circuit of said valve, and means connected to said resistances for comparing their respective potentials.

5. A circuit according to claim 4 wherein said means is arranged to connect said unknown resistance in parallel with the tank circuit.

6. A circuit according to claim 5 wherein the inductor of the tank circuit is split and the unknown resistance is connected between the two halves thereof.

7. A circuit for measuring an unknown resistance comprising a class C oscillator including an electron discharge device having a cathode, a control grid and an anode; said oscillator including a tank circuit connected to the cathode-anode path of the device and also including means for connecting the unknown resistance to the tank circuit to thereby modify the resistance of the latter; a resistor connecting the cathode of said device to ground; a bias resistor connecting the cathode side of the first-named resistor to said grid; a source of power having a negative terminal connected to ground and a positive terminal connected to said anode; and a voltmeter connected between ground and the grid side of the bias resistor.

8. The device of claim 4 in which one of said resistors include means for varying its resistance value.

9. The device of claim 7 in which one of said resistors include means for varying its resistance value.

ANDREW STRATTON.

REFERENCES CITED

The following references are of record in the file of this patent:

UNITED STATES PATENTS

| Number | Name | Date |
|---|---|---|
| 1,649,753 | Strauss | Nov. 15, 1927 |
| 1,905,348 | Edwards et al. | Apr. 25, 1933 |
| 1,969,537 | Alexanderson | Aug. 7, 1934 |
| 1,976,904 | Terman | Oct. 16, 1934 |
| 1,987,588 | Drake | Jan. 8, 1935 |
| 2,033,465 | Graham | Mar. 10, 1936 |

OTHER REFERENCES

Radio World, August 1936, page 13.